United States Patent [19]
Yasuda

[11] 3,924,489
[45] Dec. 9, 1975

[54] DIFFERENTIAL TYPE AUTOMATIC SPEED CHANGING APPARATUS INCLUDING VARIABLE SPEED TORQUE CONVERTER

[76] Inventor: Shoji Yasuda, 11-15 Kamiosaki 3-chome, Shinagawa, Tokyo, Japan

[22] Filed: Apr. 29, 1974

[21] Appl. No.: 464,951

[30] Foreign Application Priority Data
May 2, 1973 Japan ..........................49559/73

[52] U.S. Cl. ............... 74/688; 74/695; 74/718; 74/720; 74/730
[51] Int. Cl.² ......................................... F16H 47/08
[58] Field of Search ............ 74/688, 694, 695, 700, 74/718, 720, 730

[56] References Cited
UNITED STATES PATENTS

| | | | |
|---|---|---|---|
| 2,460,081 | 1/1949 | Goodchild | 74/688 |
| 2,551,396 | 5/1951 | Roosevelt | 74/688 |
| 2,693,120 | 11/1954 | Maybach | 74/720 X |
| 2,744,421 | 5/1956 | Lammerz | 74/730 X |
| 2,832,234 | 4/1958 | Sinclair | 74/730 |
| 2,848,906 | 8/1958 | Dodge | 74/688 X |
| 2,985,036 | 5/1961 | Forster | 74/730 X |
| 3,132,536 | 5/1964 | Sampietro | 74/700 |
| 3,241,400 | 3/1966 | Martin | 74/688 X |
| 3,503,277 | 3/1970 | Weinrich et al. | 74/688 X |

*Primary Examiner*—Samuel Scott
*Assistant Examiner*—Lance W. Chandler
*Attorney, Agent, or Firm*—Diller, Brown, Ramik & Wight

[57] ABSTRACT

The differential type automatic speed changing apparatus comprises a combination of a drive shaft, a driven shaft connected to a load, a variable speed torque converter including a pump and a turbine, and a differential gearing including a plurality of differential gears and a carrier. One of the differential gears is coupled with the driven shaft and the other differential gear is coupled with the pump of the torque converter whereby the speed ratio between the drive shaft and the driven shaft is varied automatically in accordance with the load on the driven shaft.

17 Claims, 7 Drawing Figures

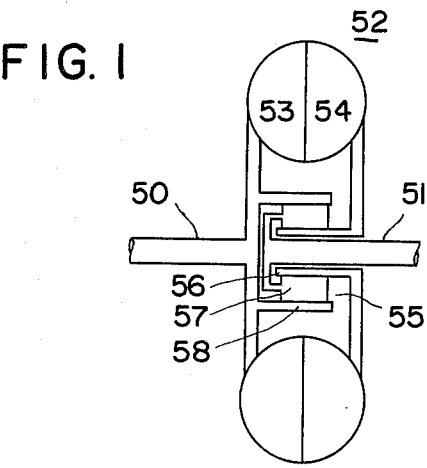
FIG. 1
PRIOR ART
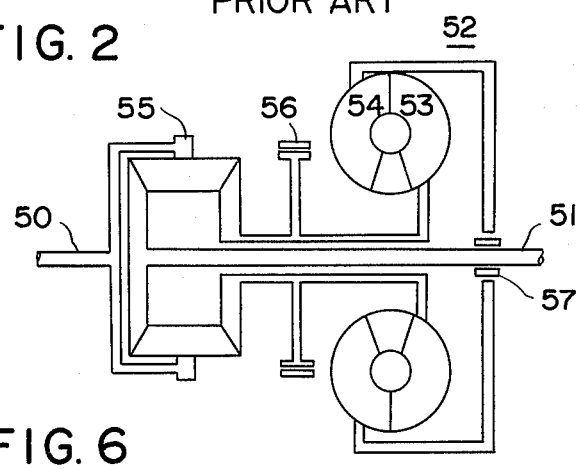
FIG. 2
FIG. 6
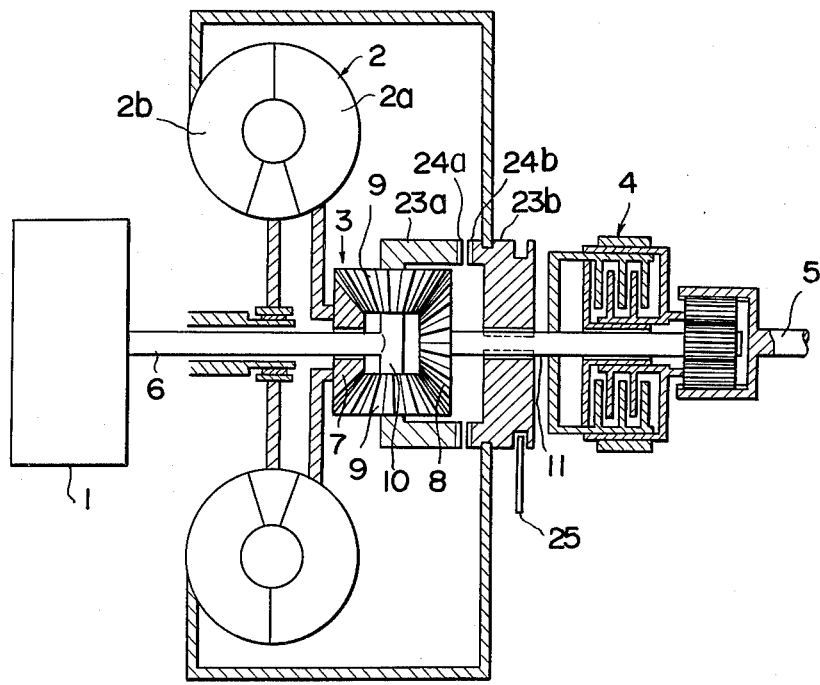

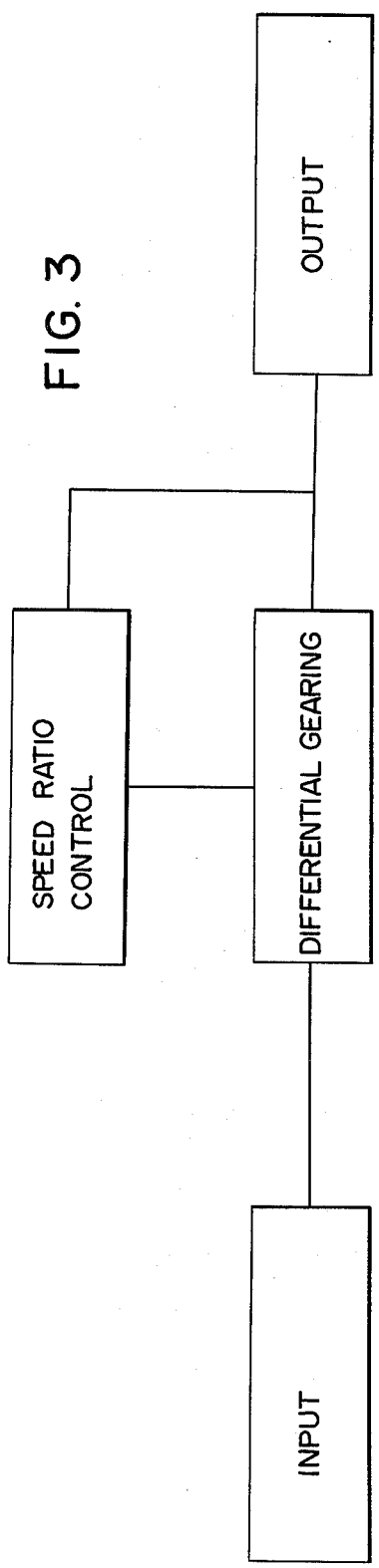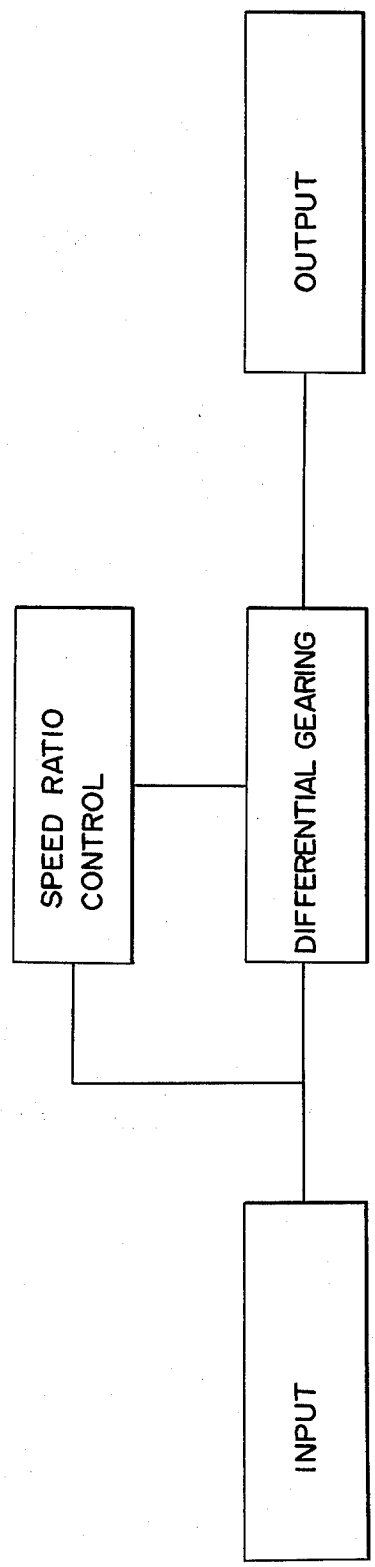

DIFFERENTIAL TYPE AUTOMATIC SPEED CHANGING APPARATUS INCLUDING VARIABLE SPEED TORQUE CONVERTER

BACKGROUND OF THE INVENTION

This invention relates to an automatic speed changer including a differential gearing and, more particularly to an automatic speed changer constructed to transmit the rotation of the drive shaft to the driven shaft at a ratio which is varied in accordance with the load imposed on the driven shaft. Fluid type torque converters have been widely used in motor cars and railway vehicles as speed changing apparatus for automatically controlling the speed ratio in accordance with the load. As is well known in the art, a torque converter is used to couple together a drive shaft and a driven shaft through liquid for automatically changing the speed of the driven shaft in accordance with the change in the load. With a conventional torque converter, however, it is impossible to ensure high efficiencies over a wide speed range of the driven shaft from start to the maximum speed so that it is usual to use a torque converter in combination with a gear type speed reducing device capable of changing the speed in two or three steps for forward operation and in one step for reverse operation so as to obtain desired speed ratios by automatically changing the speed ratio in accordance with the number of revolutions. For this reason, the mechanism of the whole speed changing apparatus is extremely complicated, requires a large number of component parts and hence is very expensive.

Further, while the torque converter exhibits an excellent acceleration characteristic for motor cars utilizing internal combustion engines having a large volume of exhaust gas and high power as in the United States of America, it has a loss of from 10 to 15 percent caused by the slip so that in small cars utilizing engines of a smaller capacity and running substantially at full load conditions, the loss of the value described above substantially affects the acceleration characteristic of the cars with the result that when the motor car goes up a steep slope it is impossible to increase the speed of the car even when the engine speed is increased. For this reason, when the driver depresses the accelerating pedal for increasing the speed, a control device operates to automatically change the gear to a lower ratio thus causing shock and unpleasant feeling to the driver and those riding in the same car.

FIG. 1 shows one example of a prior art combination of a torque converter or a liquid coupler and a planet gearing comprising a drive shaft 50, driven by an engine, not shown, a driven shaft 51, for driving a load, a torque converter 52 including a drive member or a pump 53 and a driven member or a turbine 54 which are operatively coupled together by liquid, and a planetary gearing 55 including a sun gear 56 coupled to turbine 54, planetary wheels 57 coupled to the driven shaft 51, and a ring gear 58 connected to the drive shaft 50. In addition to various defects described above, the range of speed change is limited in this arrangement so that it can be used only in certain limited applications.

FIG. 2 shows another example of the prior art combination which comprises a drive shaft 50, a driven shaft 51, a torque converter 52 including a pump 53 and a turbine 54, a differential gearing 55, a brake 56, and a free wheel 57 interposed between the turbine 54 and the driven shaft 51. Since the construction and operation of these prior art combinations are well known in the art it is believed unnecessary to describe them in detail. Although the combination shown in FIG. 2 can eliminate the defects of that shown in FIG. 1, it is necessary to drive the driven shaft 51 from the turbine or the driven element 54 via free wheel 57. However, in the arrangement shown in FIG. 2, the use of the free wheel is essential because when the operation of the torque converter ceases and only the differential gearing is used and when the righthand output gear of the differential gearing and the pump 53 are held stationary by applying braking device 56, the turbine 54 would be rotated together with the driven shaft 51 which is connected to the lefthand output gear of the differential gearing unless utilizing the free wheel 57. Thus, in the absence of the free wheel, the device will be destroyed unless the operating liquid is drained from the torque converter. Further, during the directly coupled operation the speed of the driven shaft is double that of the drive shaft it is necessary to connect an additional speed reducer to the driven shaft thus complicating the construction and increasing the cost.

SUMMARY OF THE INVENTION

Accordingly, it is an object of this invention to provide an improved differential type automatic speed changer of simple construction which has eliminated the above described various difficulties and can continuously and smoothly vary the speed ratio without any slip in accordance with the load.

Another object of this invention is to provide a novel automatic speed changer of the type comprising a combination of a differential gearing and a liquid coupler such as a torque converter which does not require a free wheel as in the similar combination of the prior art.

Still another object of the invention is to provide an improved automatic differential speed changer of simple and inexpensive construction which does not require a free wheel and an additional speed reducing mechanism on the output side.

Yet another object of this invention is to provide an improved differential automatic speed changing apparatus comprising a combination of a differential gearing, a torque converter and a blocking device whereby when the blocking device is operated, the operations of the differential gearing and the torque converter are blocked so that the loss and failure of these rotary components can be eliminated.

According to this invention, these and further objects can be accomplished by providing a differential type automatic speed changing apparatus comprising a drive shaft driven by a prime mover, a driven shaft connected to a load, a variable speed fluid coupler including a driving member and a driven member, a differential gearing including a plurality of differential gears and a carrier, means for coupling one of the differential gears with the driven shaft and means for coupling the other differential gear with the driving member of the fluid coupler whereby to vary the speed ratio between the drive shaft and driven shaft in accordance with the load.

More particularly, according to a preferred embodiment of this invention, the fluid coupler comprises a pump and a turbine operatively coupled with the pump by operating liquid, and the differential gearing prises a first pair of opposed bevel gears, a pair of bevel gears interposed between bevel gears and carried by a carrier.

posed bevel gears is coupled with the pump, whereas the other bevel gear is coupled with the driven shaft, and the carrier is coupled with the turbine and the drive shaft.

According to a modified embodiment of this invention, the apparatus further comprises a pair of cooperating blocking members including means for causing the blocking members to engage with each other. The fluid coupler comprises a pump and a turbine operatively coupled to the pump by operating liquid, and the differential gearing comprises a first pair of opposed bevel gears and a second pair of bevel gears interposed between the first pair of bevel gears and carried by a carrier. One of the opposed bevel gears is coupled with the pump whereas the other of the opposed bevel gears is coupled with the driven shaft. One of the blocking members and the carrier are coupled with the drive shaft, whereas the other of said blocking members is coupled with the turbines.

DESCRIPTION OF THE DRAWINGS

Further objects and advantage of the invention can be more fully understood from the following detailed description taken in conjunction with the accompanying drawings in which:

FIG. 1 is a diagrammatic representation of a prior art speed changer utilizing a combination of a planetary gearing and a torque converter;

FIG. 2 is a diagrammatic representation of another prior art speed changer utilizing a combination of a differential gear and a torque converter;

FIGS. 3 and 4 are block diagrams for explaining the principle of operation of the embodiments of this invention shown in FIGS. 5 and 6, respectively;

FIG. 6 is a sectional view showing a modified embodiment of this invention; and

DESCRIPTION OF THE PREFERRED EMBODIMENTS

Figure 5:
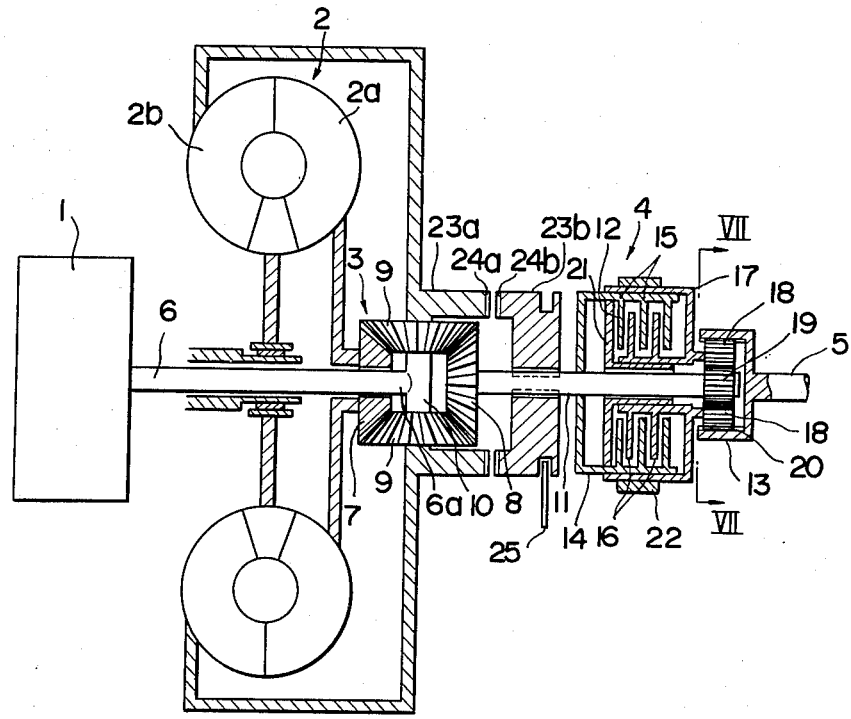
FIG. 5 is a sectional view of an automatic speed changer embodying the invention.
Figure 7:
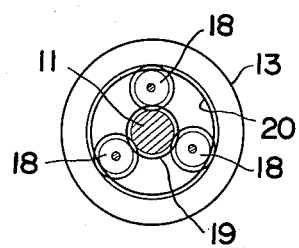
FIG. 7 shows a cross-section of the embodiment shown in FIG. 5 taken along line VII 13 VII.

Referring first to FIG. 5, a preferred embodiment shown therein comprises an internal combustion engine 1, a torque converter 2, a differential gearing 3, a reversing device 4 and a driven shaft 5 which are arranged in the order mentioned. Thus, a driven element or a turbine 2b of the torque converter 2 is connected through a carrier 10 of the differential gearing 3 to a drive shaft 6 which is driven by the crankshaft, not shown, of the engine 1, whereas the drive element or the pump 2a of the torque converter is connected directly to one bevel gear 7 of the differential gearing 3. An output bevel gear 8 of the differential gearing is coupled to the bevel gear 7 through a pair of pinions 9 which are carried by the carrier 10. The carrier 10 is connected to an extension 6a of the drive shaft 6 extending through the centers of the turbine 2b and bevel gear 7 so that the carrier 10 is rotated together with the drive shaft 6.

The shaft 11 of the driven bevel gear 8 is connected to the reversing device 4 which in this example comprises a clutch 12 and a planetary gearing 13. The clutch 12 comprises a housing 14 secured to the shaft 11 and provided with a plurality of clutch discs 15. Friction discs 16 interposed between the clutch discs 15 are secured to the inner wall of a double walled cylinder 17 which carries planet wheels 18 of the planetary gearing 13. The planet wheels 18 are interposed between a sun gear 19 secured to shaft 11 and an internal gear 20 mounted on the driven shaft 5. The clutch discs 15 and the friction discs 16 are caused to frictionally engage with each other by a fluid pressure operated cylinder 21 contained in the housing 14. A brake band 22 surrounds the outer wall of the cylinder 17.

The differential automatic speed changer operates as follows.

During the forward running of the vehicle on which the speed changer is mounted, fluid under pressure is admitted into the clutch housing 12 to operate cylinder 21 thus coupling together the clutch discs 15 and the friction discs 16. Accordingly, the driven bevel gear 8 and the driven shaft 5 are directly coupled to rotate integrally. Then, the engine 1 is started so as to rotate the drive shaft 6 together with the turbine 2b of the torque converter 2. Accordingly, pinions 9 carried by carrier 10 are caused to revolve about the axes of bevel gears 7 and 8. In this case, if the loads on the bevel gears 7 and 8 are the same, these bevel gears will rotate at the same speed. When the vehicle is at a standstill, the driven shaft 5 will be held standstill by the weight of the vehicle and the frictional resistance between the ground and the wheels of the vehicle. Thus, the load on the driven shaft 5 is large. Accordingly, at the time of starting, the pinions 9 drive the bevel gear 7 while rotating about their own axes whereby the pump 2a is driven. As is well known in the art, when the pump 2a is rotated the turbine 2b is driven by the liquid contained in the torque converter thus driving the shafts 11 and 5 in the forward direction.

During starting the speed ratio between the pump 2a and the turbine 2b is not always maintained at a ratio 2 : 1 so that a force tending to vary this ratio to 1 : 1 will be applied to the pinions 9 of the differential gearing 3 thereby tending to decrease the torque applied to the bevel gear 7 which drives the pump 2a. Thus, torque is applied to the driven bevel gear 8 causing it to rotate gradually. The rotation of the bevel gear 8 is transmitted to the driven shaft 5 via the clutch 4 and the planetary gearing 13.

Once the vehicle has started, the torque converter 2 is controlled such that the coupling efficiency between the pump 2a and the turbine 2b is increased gradually so that the vehicle is accelerated. When the speed of the vehicle reaches a predetermined speed, the acceleration pedal not shown is released by the driver, and when the shaft 11 comes to rotate at the same speed as the drive shaft 6, a solenoid operated lever 25 is actuated to cause engagement of cams 24a and 24b of blocking members 23a and 23b whereby the differential gearing 3 is blocked and the operation of the torque converter 2 is terminated. Thus the drive shaft 6 and driven shaft 11 are coupled together directly so that the vehicle is operated at a maximum speed.

Although in the embodiment shown in FIG. 5 and that shown in FIG. 6 which will be described later, the differential gearing 8 is mechanically blocked by blocking members 23a and 23b, it should be understood that the differential gearing 3 can be blocked by any other suitable means. For example, an electromagnetic coupler may be provided between the pump and turbine of the torque converter for electromagnetically coupling together the pump and turbine thereof. Alternatively, a liquid pressure operating circuit may be associated with the torque converter for directly coupling together the pump and the turbine thereof, thus blocking the differential gearing.

To drive the vehicle in the reverse direction, the liquid under pressure acting on the clutch operating cylinder 21 is exhausted for disengaging clutch discs 15 from the friction discs 16 and then the double walled cylinder 17 is held stationary by tightening band 22. Then, the rotation of the shaft 11 is transmitted to the internal gear 20 through the planet wheels 18 so that the rotation of the driven gear 5 is reversed thus driving the vehicle in the rearward direction.

In the modified embodiment shown in FIG. 6, the component elements corresponding to those shown in FIG. 5 are designated by the same reference numerals. This modification is different from the first embodiment in that the turbine 2b of the torque converter 2 is coupled to the automatic coupling member 23b instead of the carrier 10 of the differential gearing and operates in the same manner as the first embodiment.

The operation of the embodiments shown in FIGS. 5 and 6 can be more fully understood by referring to block diagrams shown in FIGS. 3 and 4 which correspond to FIGS. 5 and 6 respectively. More particularly, in the embodiment shown in FIGS. 3 and 5, the speed ratio of the torque converter is automatically controlled by the output speed of the differential gearing whereas in the embodiment shown in FIGS. 4 and 6, the speed ratio of the torque converter is controlled by the input speed of the differential gearing.

The embodiment shown in FIGS. 3 and 5 has the following advantages.

1. Until the speed ratio of the torque converter approaches 1 : 1 the pump 2a of the torque converter 2 is driven by the differential gearing at a speed higher than that of the drive shaft 6 whereby the driving torque for the driven shaft 5 is increased.
2. While the speed ratio of the torque converter is lower than 1 : 1, all of the input torque to the pump is not transmitted to the turbine and, accordingly, certain percentage of the input torque is lost. However, the slip at each speed ratio is effective to increase the speed ratio. More particularly, the torque not transmitted to the turbine is effective to drive the bevel gear 7.
3. As the automatic blocking members are engaged with each other at a predetermined high speed the differential gearing is blocked. Thus, all elements of the differential gearing rotate in unison without any relative rotation therebetween, thus preventing loss of the driving torque and wear of the component parts.

In the embodiment shown in FIGS. 4 and 6, the speed ratio of the torque converter is controlled by coupling it with the drive shaft 6. More particularly, the output bevel gear 8 of the differential gearing 3 is coupled to the pump 2a of the torque motor, while the turbine 2b is coupled to the input or drive shaft 6. All the torque generated by the pump 2a is not transmitted to the turbine 2b and the loss or difference acts as the braking force for the pump tending to drive the output bevel gear 8. Thus, it is the feature of this invention that the torque converter is not used as a conventional motion transmission mechanism but used as resistance means. In other words, according to this invention, the frictional loss created at the time of the operation of the torque converter which has been an inavoidable and fatal defect of the torque converter or a liquid transmission mechanism is used to improve the speed ratio.

As has been described hereinabove, the invention provides an improved differential type automatic speed changing apparatus wherein a drive shaft driven by an engine is coupled to the driven member or the turbine of a fluid coupler and the pinion shaft of a differential gearing, one of the bevel gears of the differential gearing is coupled with the driving member or the pump of the fluid coupler and the other bevel gear of the differential gearing is coupled to a driven shaft through a speed reduction gear so as to vary the speed ratio of the driving and driven members of the fluid coupler in accordance with the load of the driven shaft. In other words, as the speed ratio of the fluid coupler is controlled in accordance with the running load of the vehicle it is possible to run safely the vehicle without imposing undue overload upon the engine.

Moreover, as the desired speed change can be provided by a unique combination of a fluid coupler, that is a torque converter and a differential gearing constituted by only four bevel gears it is not necessary to use a speed change gearing for the purpose of changing the speed. Thus, the novel automatic speed changing apparatus has an extremely simple and inexpensive construction and hence the chance of fault is substantially decreased. Moreover, it is possible to completely eliminate the shocks at the time of changing gears.

Instead of using the four bevel gears, the differential gearing can also be constituted by spur gears, in which case the pinion carrier of the differential gearing is coupled to the drive shaft driven by the engine and to the turbine of the torque converter, one of the larg spur gears of the differential gearing is coupled with the pump of the torque converter and the other or output spur gear is coupled to the driven shaft through a reversing device.

Although a torque converter is suitable for use as the fluid coupler because of its high efficiency at low speeds, any other variable speed fluid coupler can also be used.

Instead of using a reversing device comprising a clutch and a planetary gearing it will be clear that any other type of the reversing device can also be used.

What is claimed is:

1. Differential automatic speed changing apparatus comprising a rotatable drive shaft and a rotatable driven shaft, variable speed fluid coupler means between said drive and driven shafts for imparting rotation from the former to the latter, said variable speed fluid coupler means including drive and driven elements operatively coupled together by a liquid, differential gearing means coupled between said variable speed fluid coupler means and said driven shaft for imparting rotation to the latter in conjunction with said variable speed fluid coupler means, said differential gearing means including first gear means connected to said drive element, said differential gearing means further including second gear means connected to said drive shaft and said driven element, said differential gearing means further including third gear means connected to said driven shaft, and said second gear means being between and in meshed relationship with said first and third gear means.

2. The apparatus as defined in claim 1 wherein said second gear means is a pair of gears each in mesh with said first and third gear means.

3. The apparatus as defined in claim 1 wherein said drive and driven elements are a pump and turbine, respectively.

4. The apparatus as defined in claim 1 including means for selectively coupling and uncoupling said driven shaft with said second gear means and said drive element.

5. The apparatus as defined in claim 1 including speed reducing gearing means coupled to said driven shaft, and said speed reducing gearing means including a sun gear carried by said driven shaft in meshed relationship with planetary gears which are in turn in meshed relationship with a ring gear having an output shaft.

6. The apparatus as defined in claim 1 including speed reducing gearing means coupled to said driven shaft, said speed reducing gearing means including s sun gear carried by said driven shaft in meshed relationship with planetary gears which are in turn in meshed relationship with a ring gear having an output shaft, cluth means including a plurality of interposed friction discs and clutch discs, one of said friction and clutch discs being connected to said planetary gears, and means for selectively engaging said friction discs and clutch discs to thereby reverse the direction of rotation of said output shaft relative to said driven shaft.

7. The apparatus as defined in claim 1 wherein said second gear means is connected by a common carrier to said drive shaft and drive element.

8. The apparatus as defined in claim 1 including means for selectively coupling and uncoupling said driven shaft with said second gear means and said drive element, said coupling and uncoupling means including a pair of selectively engageable blocking elements, one of said blocking elements being carried by said driven shaft, the other of said blocking elements being carried by said second gear means, and means for moving said blocking elements toward and away from each other for selectively engaging and disengaging the same.

9. The apparatus as defined in claim 1 wherein said first, second and third gear means are bevel gears.

10. The apparatus as defined in claim 2 wherein said drive and driven elements are a pump and turbine, respectively.

11. The apparatus as defined in claim 2 including means for selectively coupling and uncoupling said driven shaft with said second gear means and said drive element.

12. The apparatus as defined in claim 2 including speed reducing gearing means coupled to said driven shaft, and said speed reducing gearing means including a sun gear carried by said driven shaft in meshed relationship with planetary gears which are in turn in meshed relationship with a ring gear having an output shaft.

13. The apparatus as defined in claim 2 including speed reducing gearing means coupled to said driven shaft, said speed reducing gearing means including a sun gear carried by said driven shaft in meshed relationship with planetary gears which are in turn in meshed relationship with a ring gear having an output shaft, clutch means including a plurality of interposed friction discs and clutch discs, one of said friction and clutch discs being connected to said planetary gears, and means for selectively engaging said friction discs and clutch discs to thereby reverse the direction of rotation of said output shaft relative to said driven shaft.

14. The apparatus as defined in claim 2 including means for selectively coupling and uncoupling said driven shaft with said second gear means and said drive element, said coupling and uncoupling means including a apir of selectively engageable blocking elements, one of said blocking elements being carried by said driven shaft, the other of said blocking elements being carried by said second gear means, and means for moving said blocking elements toward and away from each other for selectively engaging and disengaging the same.

15. The apparatus as defined in claim 2 wherein said first, second and third gear means are bevel gears.

16. The apparatus as defined in claim 11 wherein said drive and driven elements are a pump and turbine, respectively.

17. The apparatus as defined in claim 12 wherein said drive and driven elements are a pump and turbine, respectively.

* * * * *